(12) United States Patent
Liu

(10) Patent No.: US 8,991,847 B2
(45) Date of Patent: Mar. 31, 2015

(54) QUICK RELEASE STRUCTURE FOR A BICYCLE

(71) Applicant: Yu-Chen Liu, Taichung (TW)

(72) Inventor: Yu-Chen Liu, Taichung (TW)

(\*) Notice: Subject to any disclaimer, the term of this patent is extended or adjusted under 35 U.S.C. 154(b) by 0 days.

(21) Appl. No.: 14/224,051

(22) Filed: Mar. 24, 2014

(65) Prior Publication Data

US 2014/0319799 A1 Oct. 30, 2014

(30) Foreign Application Priority Data

Apr. 26, 2013 (TW) ............... 102115007 A

(51) Int. Cl.
*B60B 35/00* (2006.01)
*B62K 21/24* (2006.01)
*B62K 25/02* (2006.01)

(52) U.S. Cl.
CPC .............. *B62K 21/24* (2013.01); *B62K 25/02* (2013.01); *B62K 2206/00* (2013.01)
USPC ................ 280/263; 280/288.4; 301/124.2; 301/124.1

(58) Field of Classification Search
CPC ..... B62K 21/24; B62K 2206/00; B62K 25/02
USPC ............ 280/263, 288.4, 288, 279; 301/124.2, 301/124.1, 110.5; 403/374.1–374.5
See application file for complete search history.

(56) References Cited

U.S. PATENT DOCUMENTS

| | | | | |
|---|---|---|---|---|
| 5,556,222 A * | 9/1996 | Chen | ............................. | 403/323 |
| 5,961,186 A * | 10/1999 | Phillips | ..................... | 301/124.2 |
| 7,530,645 B2 * | 5/2009 | Takachi | ..................... | 301/124.2 |
| 7,556,321 B2 * | 7/2009 | Hara et al. | ................. | 301/124.2 |
| 7,562,943 B2 * | 7/2009 | Kanehisa | ................... | 301/124.2 |
| 8,449,045 B2 * | 5/2013 | Ashman | ..................... | 301/124.2 |
| 8,573,878 B2 * | 11/2013 | Chang | ........................ | 403/322.4 |
| 8,573,879 B2 * | 11/2013 | Chang | ........................ | 403/322.4 |
| 8,820,854 B2 * | 9/2014 | Howes | ....................... | 301/124.2 |
| 8,905,492 B2 * | 12/2014 | Normand et al. | .......... | 301/124.2 |
| 2008/0284127 A1 * | 11/2008 | Watarai | ........................ | 280/279 |
| 2013/0328385 A1 * | 12/2013 | Kuo | ............................ | 301/124.2 |

\* cited by examiner

*Primary Examiner* — Joseph Rocca
*Assistant Examiner* — Michael Stabley
(74) *Attorney, Agent, or Firm* — Raymond Y. Chan; David and Raymond Patent Firm

(57) ABSTRACT

A quick release structure for a bicycle includes a locking rod fixed securely, wherein the locking rod has a polygonal groove formed therein. The driving post of the locking rod includes a polygonal head. As desiring to lock the locking rod on the bicycle frame or to unlock the locking rod from the bicycle frame, the polygonal head of the driving post retains with the polygonal groove of the locking rod so as to rotate the locking rod. When the locking rod is rotated tightly, the polygonal head of the driving post removes from the polygonal groove so that the locking rod cannot be rotated, and the driving post of the locking rod does not drive the locking rod to rotate loosely after vibration, thereby obtaining positioning safety.

2 Claims, 3 Drawing Sheets

QUICK RELEASE STRUCTURE FOR A BICYCLE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

1. Field of Invention

The present invent relates to a quick release structure for a bicycle which contains a locking rod and a driving post, wherein the locking rod is rotated tightly or loosely, and after the locking rod is rotated tightly, the driving post removes from the locking rod so that the locking rod cannot be rotated, and the driving post does not drive the locking rod to rotate loosely after vibration, thereby obtaining positioning safety.

2. Description of Related Arts

As shown in FIGS. 1 and 2, a conventional quick release structure for a bicycle contains a locking rod 10 coupled with a wheel shaft, and the locking rod 10 includes a nut 11 disposed on a first end thereof and screwing with a bicycle frame 16, the locking rod 10 also includes a driving post 12, a locking lever 13, and a positioning member 15. The driving post 12 is joined with the locking lever 13 and includes a connecting head 14 eccentrically mounted in the locking lever 13, when the locking lever 13 is rotated downwardly or upwardly, the driving post 12 and the locking rod 10 are driven to operate, thus rotating the locking rod tightly or loosely.

However, the conventional quick release structure still has defects as follows:

1. The locking lever 13 is joined with the driving post 12, and the connecting head 14 is directly inserted into the locking lever 13, accordingly the locking lever 13 can be rotated vertically but cannot be moved horizontally, so the nut 11 is provided to screw the locking rod 10 on the bicycle frame 16, yet it will remove easily because of vibration.

2. The locking lever 13 cannot be moved horizontally, the locking lever has to contact with the bicycle frame 16 downwardly, and an angle of the locking lever 13 is adjusted by screwing the nut 11 tightly, thus adjusting the locking lever 13 troublesomely.

3. The driving post 12 is directly screwed with a threaded orifice 101 of the locking lever 10, so after the locking lever 10 is rotated tightly, the driving post 12 is still coupled in the locking rod 10. Nevertheless, the locking lever 13 is touched to rotate further or vibrates easily, therefore the driving post 12 drives the locking rod 10 to rotate loosely.

4. The positioning member 15 is not provided with a reinforcement structure, thereby causing poor structural endurance.

The present invention has arisen to mitigate and/or obviate the afore-described disadvantages.

SUMMARY OF THE PRESENT INVENTION

The primary objective of the present invention is to provide a quick release structure for a bicycle which is capable of overcoming the shortcomings of the conventional quick release structure for the bicycle.

To achieve the above objectives, a quick release structure for a bicycle is provided by the present invention, which comprises a locking rod that includes external threads formed on a first end thereof and screwing with a bicycle frame, wherein the locking rod also includes a threaded orifice defined on a second end thereof. The threaded orifice has a polygonal groove formed therein. The driving post includes a polygonal head for matching with the polygonal groove, such that the locking rod is rotated tightly or loosely, and the polygonal head of the driving post retains with the polygonal groove so as to drive the driving post to actuate a rotation of the locking rod. When the locking rod is rotated tightly, the polygonal head of the driving post removes from the polygonal groove so that the locking rod cannot be rotated, and the driving post does not drive the locking rod to rotate loosely after vibration, thereby obtaining positioning safety. In addition, the locking rod is positioned at any desired angles.

Furthermore, the positioning member includes internal threads defined thereon and screwing with a reinforcing sleeve, and the positioning member includes a screw bolt for screwing with the locking rod, such that the reinforcing sleeve and the screw bolt can enhance reinforcement and endurance of the quick release structure.

DETAILED DESCRIPTION OF THE PREFERRED EMBODIMENT

Figure 1:
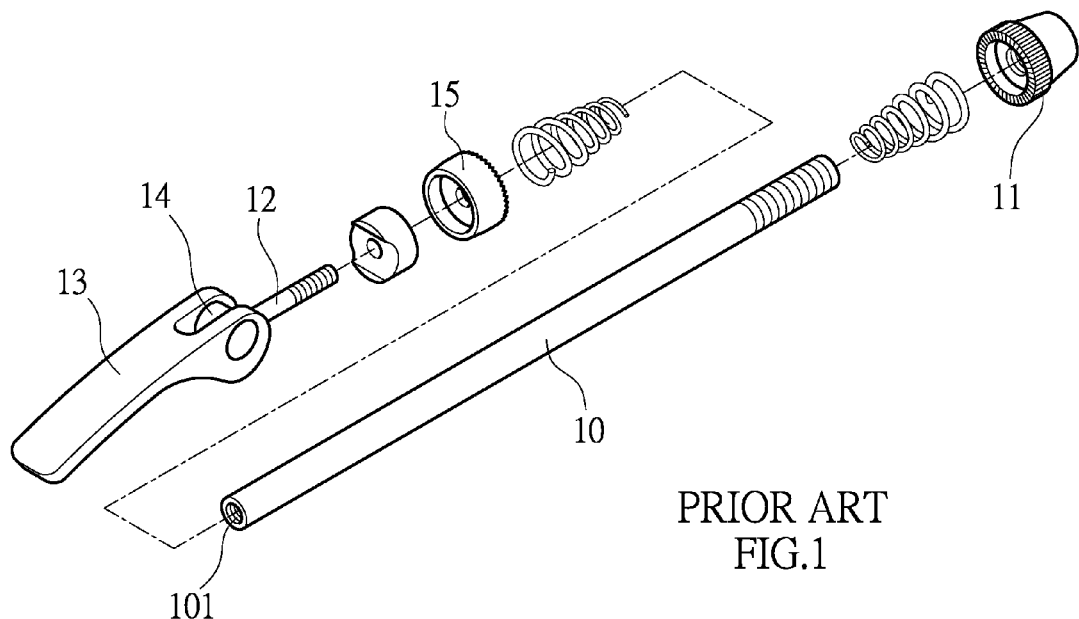
FIG. 1 is a perspective view showing the exploded components of a conventional quick release structure for a bicycle.
Figure 2:
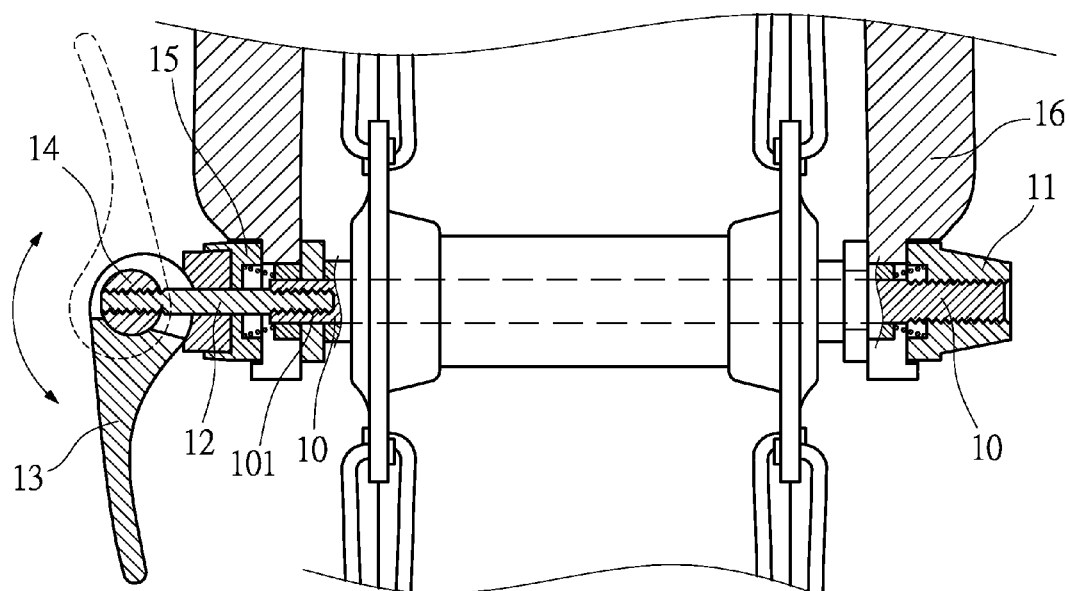
FIG. 2 is a cross sectional view showing the assembly of the conventional quick release structure for the bicycle.
Figure 3:
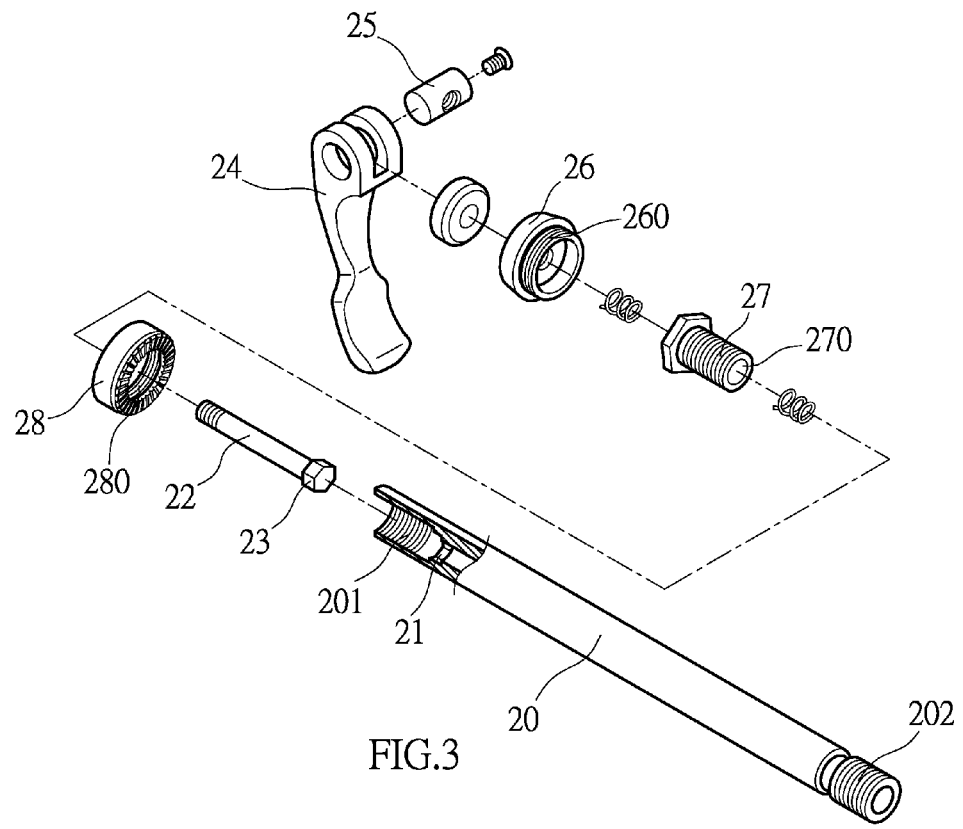
FIG. 3 is a perspective view showing the exploded components of a quick release structure for a bicycle according to a preferred embodiment of the present invention.

With reference to FIGS. 3 to 6, a quick release structure for a bicycle according to a preferred embodiment of the present invention comprises a locking rod 20, a driving post 22, a positioning member 28, a connecting protrusion 25, and a fixing lever 24. The driving post 22 is in connection with the connecting protrusion 25 and is mounted in the fixing lever 24. The driving post 22 is also fixed into the locking rod 20. The locking rod 20 includes external threads 202 formed on a first end thereof and screwing with a bicycle frame 17, wherein the locking rod 20 also includes a threaded orifice 201 defined on a second end thereof, and the threaded orifice 201 has a polygonal groove 21 formed therein. The driving post 22 includes a polygonal head 23 for matching with the polygonal groove 21, such that the fixing lever 24 drives the driving post 22 to move forward so that the polygonal head 23 of the driving post 22 moves into the threaded orifice 201 to retain with the polygonal groove 21 of the locking rod 20, thus driving the locking rod 20 to rotate. Furthermore, the fixing lever 24 drives the driving post 22 to move backward so that the polygonal head 23 of the driving post 22 removes from the polygonal groove 21 of the locking rod 20, and the locking rod 20 is not rotated. The threaded orifice 201 of the locking rod 20 includes a screw bolt 27 with a through hole 270. The screw bolt 27 inserts through the positioning member 28, and the driving post 22 inserts through the through hole 270 of the screw bolt 20. The positioning member 28 includes internal threads 280 defined thereon and screwing with a reinforcing sleeve 26 which has an outer screwing section 260 arranged around an outer wall thereof so as to screw with the internal threads 280 of the positioning member 28.

Figure 4:
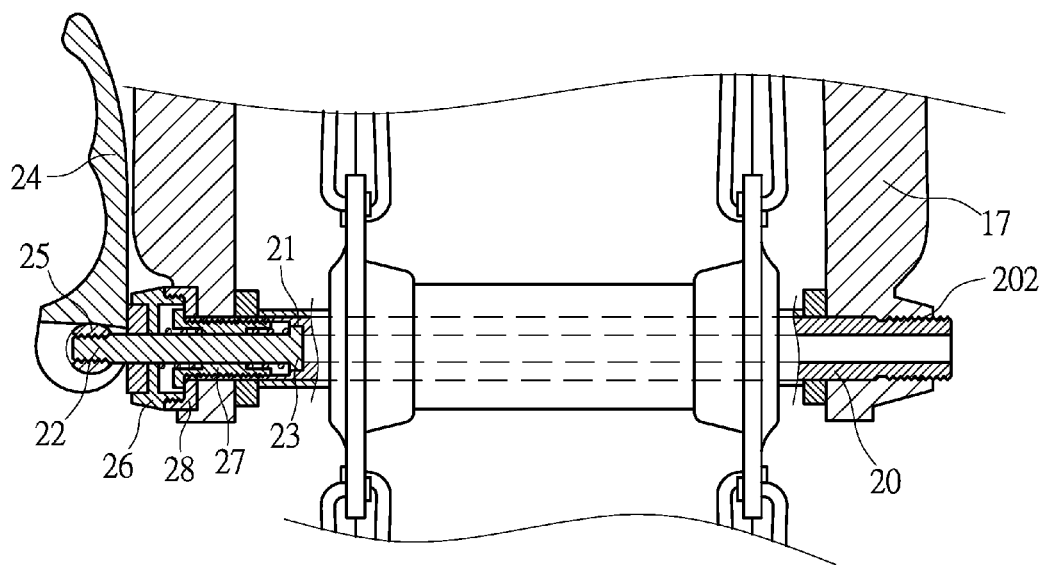
FIG. 4 is a cross sectional view showing the operation of the quick release structure for the bicycle according to the preferred embodiment of the present invention.
Figure 5:
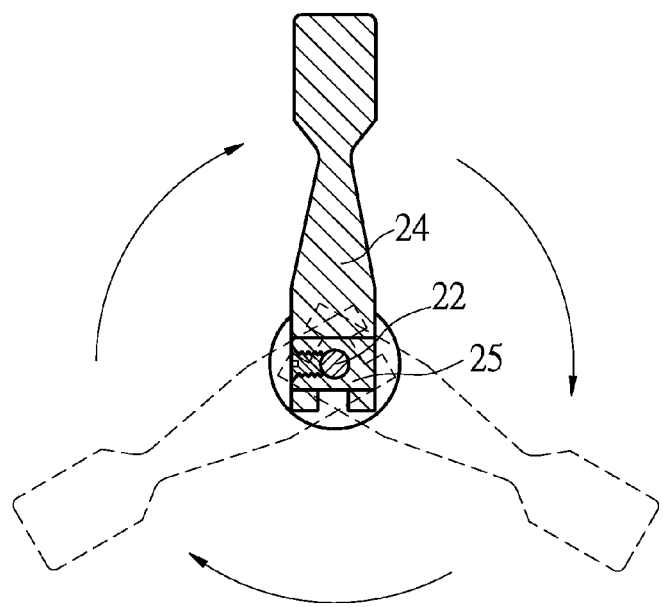
FIG. 5 is a cross sectional view showing the operation of a locking rod of the quick release structure for the bicycle according to the preferred embodiment of the present invention.

Thereby, the quick release structure of the present invention has advantages as follows:

1. Referring to FIGS. 4 and 5, as desiring to rotate the locking rod 20 tightly or loosely, the driving post 22 moves forward to drive the polygonal head 23 to retain with the polygonal groove 21 of the locking rod 20, and the fixing lever 24 is rotated (as shown in FIG. 5) so as to drive the driving post 22 to actuate a rotation of the locking rod 20.

Figure 6:
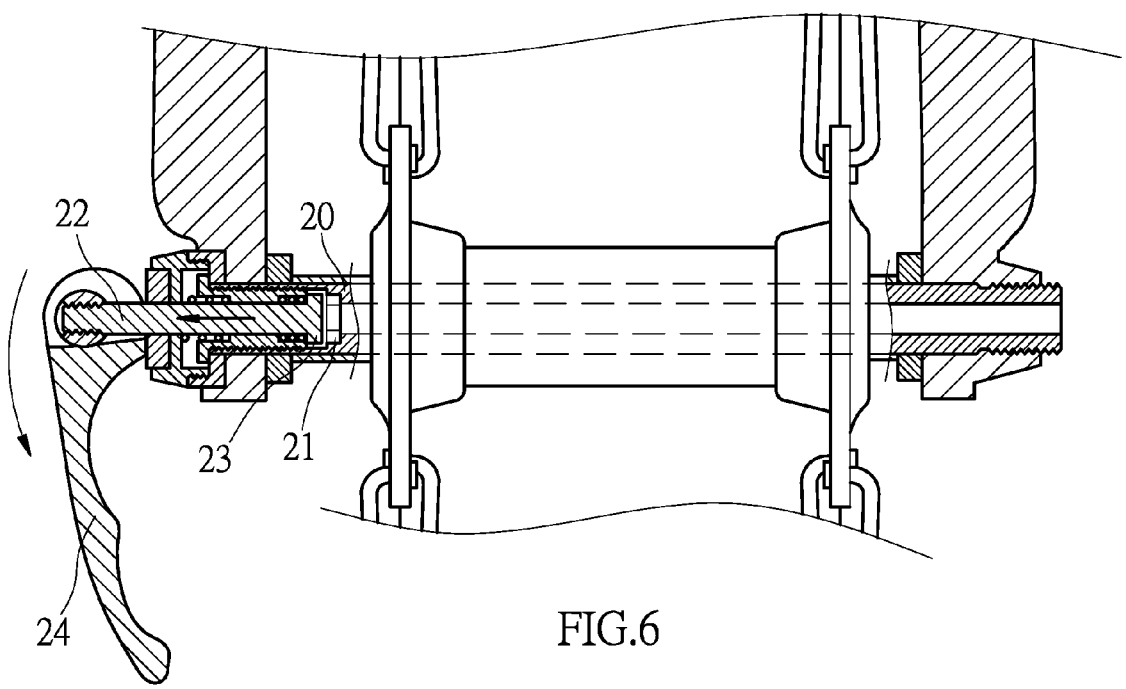
FIG. 6 is a cross sectional view showing the operation of a polygonal head of the quick release structure for the bicycle according to the preferred embodiment of the present invention.

2. After the locking rod 20 is rotated tightly, as illustrated in FIG. 6, the driving post 22 is moved backward so that its polygonal head 23 removes from the polygonal groove 21 of the locking rod 20, hence the locking rod 20 is not rotated and is fixed securely.

3. Since the driving post 22 can be rotated idly, the fixing lever 24 is positioned at any desired angles and positions.

4. With reference to FIGS. 3 to 6, the threaded orifice 201 of the locking rod 20 includes the screw bolt 27, and the positioning member 28 screws with the reinforcing sleeve 26, thus enhancing reinforcement and endurance. In other words, the quick release structure of the present invention can endure a powerful locking force and can be locked fixedly. Preferably, the quick release structure is not broken easily and its service life is prolonged.

In addition, the polygonal head 23 of the driving post 22 is formed in an ellipse shape (i.e., its longitudinal distance is not identical to its lateral distance), and the locking rod 20 has an oval groove for corresponding to the polygonal head 23 in an ellipse shape. Hence, the driving post 22 drives the locking rod 20 to rotate.

It is to be noted that the polygonal head 23 can be of various shapes for corresponding to the polygonal groove of the locking rod 20 so as to drive the locking rod 20 to rotate, thus screwing the locking rod 20 on the bicycle frame 17.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A quick release structure for a bicycle comprising:
a locking rod, a driving post, a positioning member, a connecting protrusion, and a fixing lever; the driving post being in connection with the connecting protrusion and being mounted in the fixing lever, the driving post being also fixed into the locking rod, and the locking rod including external threads formed on a first end thereof and screwing with a bicycle frame; the locking rod also including a threaded orifice defined on a second end thereof, and the threaded orifice having a polygonal groove formed therein; the threaded orifice of the locking rod including a screw bolt with a through hole, the screw bolt inserting through the positioning member, and the driving post inserts through the through hole of the screw bolt, the driving post including a polygonal head for matching with the polygonal groove, such that the fixing lever drives the driving post to move forward so that the polygonal head of the driving post moves into the threaded orifice to retain with the polygonal groove of the locking rod, thus driving the locking rod to rotate, or the fixing lever drives the driving post to move backward so that the polygonal head of the driving post removes from the polygonal groove of the locking rod, and the locking rod is not rotated.

2. The quick release structure for the bicycle as claimed in claim 1, wherein the positioning member includes internal threads defined thereon and screwing with a reinforcing sleeve, and the reinforcing sleeve has an outer screwing section arranged around an outer wall thereof so as to screw with the internal threads of the positioning member.

\* \* \* \* \*